United States Patent
Roth-Fagaraseanu et al.

(10) Patent No.: US 9,458,763 B2
(45) Date of Patent: Oct. 4, 2016

(54) COMPONENT AND TURBOMACHINE HAVING A COMPONENT

(71) Applicants: Rolls-Royce Deutschland Ltd & Co KG, Blankenfelde-Mahlow (DE); Fraunhofer Gesellschaft zur Foerderung der angewandten Forschung e.V., Munich (DE)

(72) Inventors: Dan Roth-Fagaraseanu, Stahnsdorf (DE); Thomas Wunderlich, Rangsdorf (DE); Yannick Cadoret, Berlin (DE); Frank Brueckner, Dresden (DE); Mirko Riede, Meiningen (DE)

(73) Assignees: ROLLS-ROYCE DEUTSCHLAND LTD & CO KG, Blankenfelde-Mahlow (DE); Fraunhofer Gesellschaft zur Foerderung der angewandten Forschung e.V., Munich (DE)

( * ) Notice: Subject to any disclaimer, the term of this patent is extended or adjusted under 35 U.S.C. 154(b) by 133 days.

(21) Appl. No.: 13/668,703

(22) Filed: Nov. 5, 2012

(65) Prior Publication Data
US 2013/0157000 A1    Jun. 20, 2013

(30) Foreign Application Priority Data
Nov. 4, 2011  (DE) .................. 10 2011 085 801

(51) Int. Cl.
*F02C 7/00*  (2006.01)
*F01D 9/02*  (2006.01)
(Continued)

(52) U.S. Cl.
CPC . *F02C 7/00* (2013.01); *B32B 3/12* (2013.01); *B32B 3/263* (2013.01); *F01D 9/023* (2013.01);
(Continued)

(58) Field of Classification Search
CPC ......... B32B 3/12; B32B 3/263; F01D 9/023; F23M 5/04; F02C 7/00; F23R 3/002
See application file for complete search history.

(56) References Cited

U.S. PATENT DOCUMENTS

| 4,594,053 A | 6/1986 | Sohngen |
| 4,639,388 A * | 1/1987 | Ainsworth .............. B32B 15/04 228/120 |

(Continued)

FOREIGN PATENT DOCUMENTS

| DE | 10121019 | 10/2002 |
| DE | 10124398 | 11/2002 |

(Continued)

OTHER PUBLICATIONS http://doidge.com/original/english/solid.html, internet archive date of Mar. 12, 2006.*

*Primary Examiner* — Jonathan Langman
(74) *Attorney, Agent, or Firm* — Timothy J. Klima; Shuttleworth & Ingersoll, PLC

(57) ABSTRACT

A component, especially contrived and designed for being used in a turbomachine, includes a high-temperature coating being arranged above a base of the component. The base has at least one structural element for connecting it to the high-temperature coating, with the cross-section of the at least one structural element having at least three different widths, i.e. a base width at the lower end of the at least one structural element, a center width above it, and a tip width above that, where on average the center width is greater than or equal to the base width, but less than four times the base width, in particular less than or equal to three times the base width.

19 Claims, 4 Drawing Sheets

Figure 1:
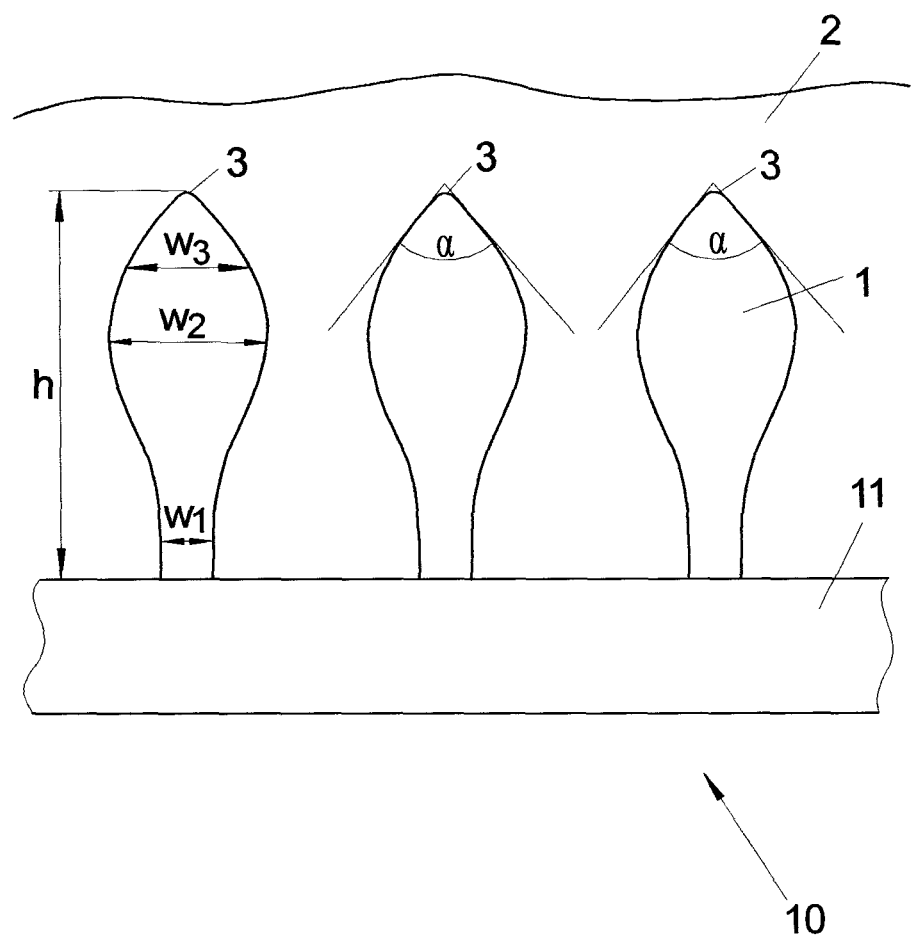

(51) Int. Cl.
*F23R 3/00* (2006.01)
*B32B 3/12* (2006.01)
*B32B 3/26* (2006.01)
*F23M 5/04* (2006.01)

(52) U.S. Cl.
CPC ............ *F23M 5/04* (2013.01); *F23R 3/002* (2013.01); *F23M 2900/05004* (2013.01); *Y02T 50/675* (2013.01); *Y10T 428/24149* (2015.01); *Y10T 428/24521* (2015.01); *Y10T 428/24545* (2015.01)

(56) References Cited

U.S. PATENT DOCUMENTS

| | | |
|---|---|---|
| 5,866,271 A | 2/1999 | Stueber et al. |
| 5,894,053 A * | 4/1999 | Fried .............................. 428/548 |
| 6,457,939 B2 | 10/2002 | Ghasripoor et al. |
| 6,652,227 B2 | 11/2003 | Fried |
| 8,707,541 B2 * | 4/2014 | Doerfler .................... B23P 9/00 29/558 |
| 2002/0146541 A1* | 10/2002 | Fried ............................ 428/172 |
| 2003/0170119 A1* | 9/2003 | Fried ......................... 415/173.4 |
| 2014/0127005 A1* | 5/2014 | Schreiber ................. B22C 7/02 415/170.1 |

FOREIGN PATENT DOCUMENTS

| | | | |
|---|---|---|---|
| DE | 10 2005 050 873 | 4/2007 | |
| DE | 10 2009 011 913 | 9/2010 | |
| EP | 1 491 658 | 12/2004 | |
| WO | WO2012131100 | * 10/2012 | ............... F01D 5/28 |

* cited by examiner

COMPONENT AND TURBOMACHINE HAVING A COMPONENT

This application claims priority to German Patent Application 102011085801.6 filed Nov. 4, 2011, the entirety of which is incorporated by reference herein.

This invention relates to a component for use in a turbomachine and to a turbomachine having this component.

In turbomachines, such as aircraft engines or stationary steam or gas turbines, for example, very high working temperatures are reached in operation. In modern aircraft engines, for example, up to more than 2000 K can be reached. As a result, certain parts of the turbomachine, for example combustion chambers or the inlet area of the turbine in an aircraft engine, are subjected to very high thermal loads. Furthermore, these components must additionally withstand high mechanical loads, particularly during starting of a turbine, since the tips of the turbine blades, at least briefly, contact the turbine wall.

It is therefore known to cover certain parts of the turbomachine with a mechanically stable, heat-resistant and multi-layer coating. A multi-layer coating of this type is known from EP 1 491 658 A1. A so-called metallic bond coat is applied to a metallic base, onto which coat a ceramic coating is applied in turn. Together these two coatings are also referred to as Thermal Barrier Coating (TBC).

Components are known from U.S. Pat. Nos. 6,652,227 B2 and 6,457,939 B2 in which the metallic base material itself is structured in a complex way in order to allow a ceramic coating arranged thereon to adhere better.

It is therefore worthwhile to develop thermally and mechanically stable components which can be securely connected to a high-temperature coating.

To do so, a base of a component has at least one structural element for connection to the high-temperature coating, where the cross-section of the at least one structural element has at least three different widths, i.e. a base width at the lower end of the at least one structural element, a center width above it and a tip width above that, where on average the center width is greater than or equal to the base width, but less than four times the base width, in particular however less than or equal to three times the base width. Thanks to this shaping, an undercut is achieved which is deep enough for secure anchoring of the high-temperature coating, however not too deep to permit reliable filling in of the undercut.

In an advantageous embodiment, the base width and/or the center width and the tip width are on average less than or equal to the height of the at least one structural element measured from the lower end of the at least one structural element. The influence on the surface modification is limited by a high limitation.

If, in an advantageous embodiment, the tip width of the at least one structural element is on average less than the center width, a structure is obtained that becomes narrower towards the top. This has the advantage that it can generate in targeted manner vertical cracks in the high-temperature coating, which can lead to a reduction in stresses.

A further advantageous embodiment has at least one structural element, which has a mean height of between 100 and 500 μm measured from the lower end to the tip. It is also advantageous if the center width and the tip width of the structural element are on average less than or equal to the height of the structural element.

The base of the component is not unduly affected when the at least one structural element has on average a base width of more than 30 μm and less than 500 μm.

In another embodiment, the center width and/or the tip width of the at least one structural element is on average less than the height of the at least one structural element.

The structural elements are advantageously combined into structure patterns. It is particularly advantageous when a structure pattern has at least two structural elements, with the at least two structural elements intersecting or being arranged parallel to one another. It is particularly advantageous when the structure pattern has the form of a grid, a net structure, a honeycomb structure or a wavy structure of waves running parallel to one another.

Good prevention of unwelcome cracks is achieved by embodiments in which the distance between two parallel sections of two structural elements is between 500 and 5000 μm.

It is also advantageous when the at least one structural element has a linear structure or a curve-like structure with a mean width of 100 to 400 μm at the widest point (in particular the center width).

It is furthermore advantageous when the flanks converge at the tip of the structural element at an angle which is on average less than 180°, particularly less than 120°, and very particularly less than or equal to 90°. As a result, tips are formed upwards that are expedient for the generation of vertical cracks 12.

In an embodiment, the invention can be directed to a turbomachine, in particular an aircraft engine.

In an embodiment, at least one component is arranged here in a combustion chamber, on the wall of the turbine and/or in the inlet area of the high-pressure part of a turbine.

Figures 3A, 3B, 3C:
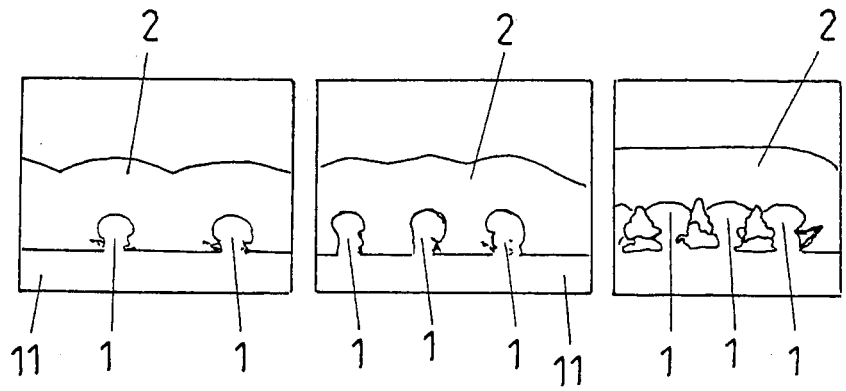
Figure 4:
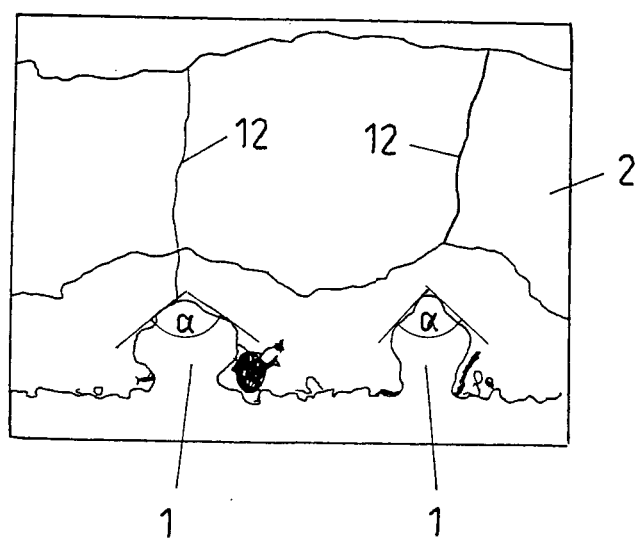
Figure 5:
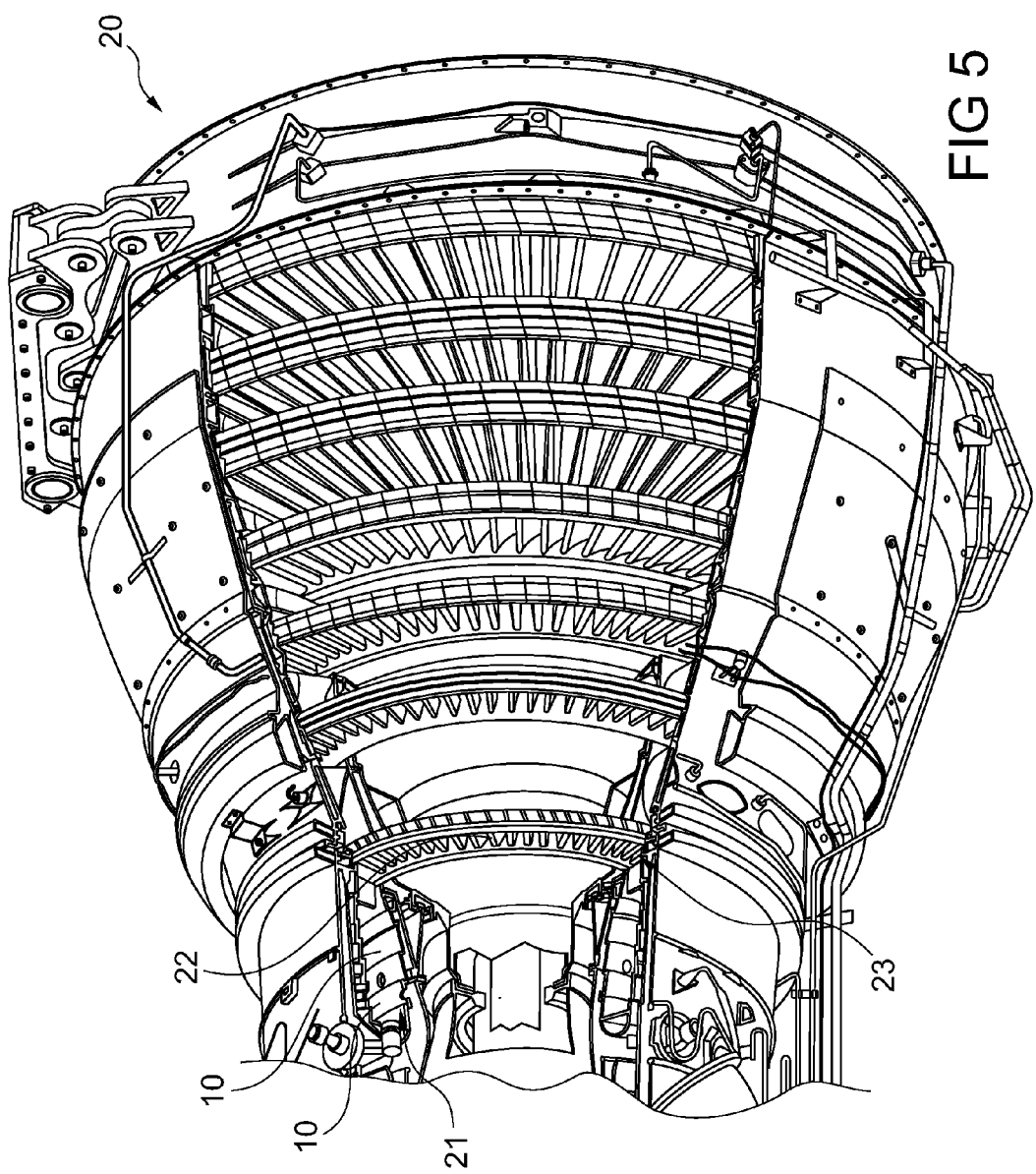

In the following figures, different embodiments are described by way of examples. In the drawings, FIG. 1 shows a schematic representation of a structural element for the connection of a structural zone to a high-temperature coating, FIGS. 2A-D show schematic top views onto structure patterns on a component, FIGS. 3A-C show fine detail resolutions of microscopic sectional views with different distances between structural elements, FIG. 4 shows a fine detail resolution of a microscopic sectional view with targeted inducement of a vertical crack, FIG. 5 shows a representation of a part of an aircraft engine with a component provided with structural elements.

FIG. 1 shows a sectional view through a part of a component 10 which is designed in particular for use in high-temperature areas of turbomachines.

The component 10 itself has, in the embodiment shown, a base 11 made from a metallic material. The metallic material has for example a proportion of M CrAlY with M=Fe, Ni and/or Co,
M CrAl with M=Fe, Ni and/or Co,
NiAl or NiAlPt, or is completely made from these materials. These materials are to temperature-stable and readily workable.

The at least one structural element 1 arranged on the base 11 can be made from both, metallic or ceramic material, and from a mixture of the two latter materials. This material has for example a proportion of M CrAlY with M=Fe, Ni and/or Co,
M CrAl with M=Fe, Ni and/or Co,
NiAl or NiAl Pt,
YSZ,
Aluminate,
Pyrochlore,
Perowskite, or is completely made from these materials.

Above the base 11, a high-temperature coating 2 is arranged, for example made from an oxidic ceramic, in particular containing yttrium, zirconium, zirconium oxide, magnesium spinet and/or aluminium oxide. One example is yttria-stabilized zirconia (YSZ).

To ensure a secure connection of the base 11 to the high-temperature coating 2, the base has a row of structural elements 1 designed in a particular way. In the exemplary embodiment shown here, there are three parallel and substantially uniform structural elements 1.

Figure 2A:
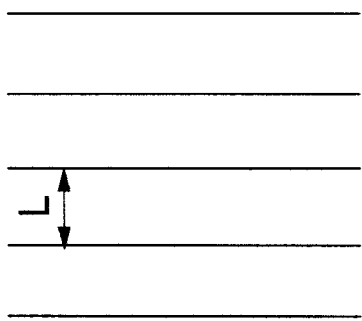

In the embodiment shown, the structural elements 1 extend into the drawing plane and are for example in linear form at least in some sections (see for example FIG. 2A). The structural elements 1 in the embodiment shown here are designed in one piece with the base 11, i.e. they are made from the same material. In other embodiments, the structural elements 1 can also include a different material to that of the base 11.

The structural elements 1 with the undercuts can for example be manufactured by an isotropic etching method, by electrochemical machining and/or by a generative laser method, for example laser cladding.

A possible etching method for the above-mentioned materials, preferably containing Ni, uses for example a mixture of an aqueous iron (III) chloride solution, hydrochloric acid and nitric acid. In an embodiment the etching is conducted in the boiling state. For cobalt-containing materials, for example, a mixture of distilled water and nitric acid, a mixture of hydrochloric acid, nitric acid and iron (III) chloride or a mixture of distilled water, hydrochloric acid and copper (II) sulphate can be used.

If undercuts are required during electrochemical machining, this can be achieved by a multi-stage process or simultaneous multi-axis tracking.

The structural elements 1 have a height h between 100 μm and 500 μm measured from the base 11 to the tip 3. The cross-section of the structural element 1 has at least three different widths: a relatively narrow base width $w_1$ at the foot of the structural element 1, a center width $w_2$ above it and a tip width $w_3$ above that.

The tip width $w_3$ is, in the vertical direction, at the center between the tip 3 of the structural element 1 and the center width $w_2$. The center width $w_2$ indicates the widest point of the structural element 1.

The center width $w_2$ is greater than or equal to the base width $w_1$, but less than four times, especially three times the base width $w_1$: $w_1 \leq w_2 \leq 3w_1 < 4w_1$.

In the embodiment shown, the tip width $w_3$ is less than or equal to the center width $w_2$, i.e. the cross-section of the structural element 1 tapers upwards. The angle α at the tip (i.e. the angle at which the flanks of the structural element 1 converge) is less than 180°, in particular less than 120°, and very particularly less than or equal to 90°. The opened angle α faces here in the direction of the base 11.

As will be shown in the following, these size relationships not only permit a particularly firm connection of the high-temperature coating 2 to the base 11, but also have further advantages.

Thus the structural element 1 has underneath the center width $w_2$ an undercut into which the material of the high-temperature coating can pass (see FIG. 3). Due to the undercut, the material of the high-temperature coating 2 is fixed vertically to the base 11. The condition $w_1 < w_2$ thus leads to a mechanical clamping of the base 11 and the high-temperature coating 2.

However, the undercut at the structural element 1 may not be designed too deep, as otherwise shading effects will lead to an uneven material accumulation in the area of the undercut when the high-temperature coating 2 is applied.

Tests have shown that by limiting the center width $w_2$ to a maximum of three times the base width $w_1$, these shading effects do not play a noteworthy role. Hence the ratio of the widths $w_1$, $w_2$, $w_3$ of the structural element 1 is of functional importance.

It has furthermore become clear that certain other geometrical conditions also have advantageous effects.

For the influencing of the base 11 not to become too great, it is expedient to introduce an upper limit for the base width $w_1$. A width of less than 500 μm has proven useful.

The center width $w_2$ and/or the tip width $w_3$ should on average be less than the height h of the structural element 1. The maximum height of the structural element of 500 μm thus represents an upper limit for the widths.

A further aspect is that vertical cracks are induced in targeted manner in the ceramic high-temperature coating 2 by the structural elements 1 in order to achieve a mechanical stress relief inside the high-temperature coating 2. These vertical cracks can form particularly efficiently when the structural element 1 tapers upwards, i.e. to the tip 3 ($w_3 < w_2$) and ends at an angle less than 180°. In the embodiment shown, the angle α at the tip 3 is about 90°. But vertical cracks 12 can be induced with larger angles too (see FIG. 4).

In different types of embodiments, these features can be used individually or in combination.

FIG. 4 shows the inducement of vertical cracks 12 on a real microscopic sectional view. The cracks 12 are here caused in targeted form by the structural element 1 tapering to the tip 3.

FIGS. 2A to 2D show different structure patterns 30 made up of structural elements 1. The structure patterns 30 should in particular prevent large-area flaking of the high-temperature coating 2. Also, cracks in the high-temperature coating 2 cannot extend to any width in the horizontal direction. The structure patterns 1 can here intersect or be arranged parallel to one another.

Figure 2B:
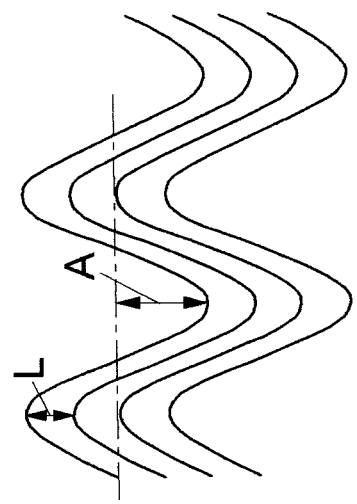

FIG. 2A shows a structure pattern 30 of parallel and linear structural elements 1. The distance L between the structural elements 1 is here between 500 and 5000 μm. The structure patterns 30 must however have not only linear structural elements 1. FIG. 2B shows a wave-like structure pattern 30 of curved structural elements 1 parallel to one another. Here too, the distance L between the structural elements 1 is between 500 and 5000 μm. Particularly at an amplitude A of the wave structure which is larger than the distance L between the structural elements, crack propagation can be effectively prevented.

Figure 2C:
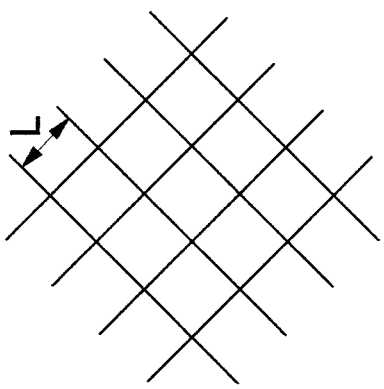

FIG. 2C shows an embodiment in which the structural elements 1 intersect. The result is a grid structure where the distance L between the parallel structural elements 1 is between 500 and 5000 μm.

Figure 2D:
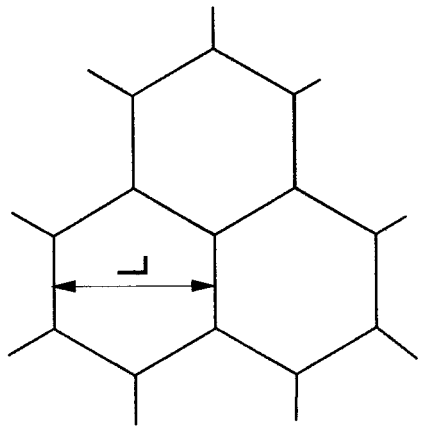

FIG. 2D shows a honeycomb-like structure pattern 30 made up of linear structural elements 1. The distance L between two parallel structural elements 1 is between 500 and 5000 μm.

Generally speaking, it is possible to arrange on a component 10 several differently shaped structural elements 1 and/or also different structure patterns 30. In this way, in particular the distance L inside a pattern can be varied to ensure an optimum adaptation of the component 10 to thermal loads.

FIGS. 3A to C show that the distance between the structural elements 1 must not be selected too narrow, as otherwise the ceramic compound cannot be deposited sufficiently around the structural elements, in particular into the undercuts. FIG. 3A and FIG. 3B show an acceptable enclosure of the structural elements 1. In FIG. 3C, the structural elements 3 are arranged too close together, such that the high-temperature coating 2 can no longer form in the optimum manner.

FIG. 5 shows some sections of an aircraft engine 20, in which components 10 of the type previously described are used. The individual embodiments can here be used individually or in combination.

Particularly high thermal loads prevail inside the combustion chamber 21. For that reason, plate-like components 10 with the coating described are arranged in the interior of the combustion chamber 21.

The highest temperature prevails at the outlet of the gases from the combustion chamber 21 and at the inlet into the high-pressure stage 22 of the turbine. For that reason, it is advantageous when components 10 are additionally or alternatively arranged inside the high-pressure stage 22. These components 10 are here advantageously not designed as plates, instead the coating 1 is for example arranged directly in the area of the stator of the turbine. Hence the area of the stator per se becomes the coated component 10. Generally speaking, it is also possible that the coated components 10 also have ducts or openings for cooling media.

It is furthermore possible to provide the blades of rotors and/or stators too with the coating so that these blades become components 10 in the meaning of the present description.

A further possibility is to use the component 10 as a coating, i.e. as a so-called liner 23 in the wall of the turbine, i.e. in particular in those areas opposite the blades of the rotors. Liners 23 can be used in areas in which rotor blades, for example of the turbine, at least temporarily have mechanical contact with the wall of the casing. This is at least very welcome for minimizing the gap between wall and turbine blade. The components 10 with one-piece structural elements 1 and a ceramic coating 2 have not only a high thermal loading capacity, but are also mechanically designed to be used as liners 23.

In combustion chambers too, liners 23 can be used, or the coating can become directly part of the combustion chamber wall.

Generally speaking, the component 10 can be used at those points at which thicker ceramic coatings are usually arranged.

With the embodiments described herein, it is possible to provide a fine structure directly onto a bond-coat material, where the height remains less than 500 μm and the metallic base 11 is not impaired. In operation, only minor thermal gradients occur inside the structural elements 1. The adhesion of the coating to the base material is also very good. These embodiments also have a high resistance to oxidation.

It is furthermore possible to repair and/or rework a component 10 using known chemical and/or mechanical methods.

LIST OF REFERENCE NUMERALS

1 Structural element
2 High-temperature coating
3 Tip of structural element
10 Component
11 Base
12 Vertical crack
20 Aircraft engine
21 Combustion chamber
22 High-pressure stage of an aircraft engine
23 Liner at the wall of an aircraft engine
30 Structure pattern
α angle at the tip of the structural element
h Height of structural element
$w_1$ Base width of structural element
$w_2$ Center width of structural element
$w_3$ Tip width of structural element
L Distance between structural elements
A Amplitude of a wave-like structural element

What is claimed is:

1. A component for a turbomachine, comprising:
a base;
a high-temperature coating being arranged above the base, the base including a plurality of structural elements for connecting the base to the high-temperature coating, a cross-section of each of the structural elements having at least three different widths, including a base width at a lower end of the at least one structural element adjacent the base, a center width above the base width, and a tip width of a tip portion above the center width, where on average the center width is a greater width of each structural element, but is less than four times the base width;
wherein the tip portion includes a shape facing outward from the base that is tapered to be more pointed than a hemi-sphere facing outward from the base and having the center width as a diameter, and wherein opposing flanks of the tip portion converge together at an angle less than 180°, on average;
wherein the tapered outward facing tip portions of the plurality of structural elements form stress risers in the high-temperature coating for the creation of stress-relieving vertical cracks in the high-temperature coating.

2. The component of claim 1, wherein the at least one structural element is made from a material including at least one chosen from:
M CrAlY with M=at least one chosen from Fe, Ni and Co,
M CrAl with M=at least one chosen from Fe, Ni and Co,
NiAl or NiAlPt,
YSZ,
Aluminate,
Pyrochlore,
Perowskite.

3. The component of claim 1, wherein on average, at least one chosen from the base width, the center width and the tip width is less than or equal to a height of the at least one structural element, measured from the lower end of the at least one structural element.

4. The component of claim 1, wherein on average, the tip width of the at least one structural element is less than the center width.

5. The component of claim 1, wherein the at least one structural element has a mean height from 100 μm to 500 μm measured from a lower end to the tip.

6. The component of claim 1, wherein the center width and the tip width of the structural element are on average less than or equal to a height of the at least one structural element.

7. The component of claim 1 wherein the at least one structural element has on average a base width from 30 μm to 500 μm.

8. The component of claim 7, wherein the at least one structural element has on average a base width from 50 μm to 500 μm.

9. The component of claim 1, wherein at least one chosen from the center width and the tip width of the at least one structural element is on average less than the height of the at least one structural element.

10. The component of claim 1, comprising at least two structural elements in a structure pattern, where the at least two structural elements at least one chosen from intersect or are arranged parallel to one another.

11. The component of claim 10, wherein the structure pattern has a form of at least one chosen from a grid, a net structure, a honeycomb structure and a wavy structure of waves running parallel to one another.

12. The component of claim 11, wherein a distance between two parallel sections of two structural elements is from 500 to 5000 µm.

13. The component of claim 1, wherein the at least one structural element includes at least one chosen from a linear structure and a curve-like structure with a mean width of from 100 to 400 µm at a widest point.

14. The component of claim 1, wherein, on average the center width is less than or equal to three times the base width.

15. The component of claim 1, wherein opposing flanks of the tip portion converge together at an angle less than 120°, on average, wherein the angle is measured between two lines tangent to each structural element at opposite circumferential positions between 1) the tip and 2) a portion halfway between the tip and a position of the center width, the two lines converging to intersect at a point on or adjacent the tip.

16. The component of claim 15, wherein opposing flanks of the tip portion converge together at an angle less than or equal to 90°, on average.

17. The component of claim 1, wherein a minimum distance from a position of the center width to an outermost portion of the tip is greater than ½ * the center width.

18. A turbomachine having at least one component according to claim 1, with the at least one component being arranged in at least one chosen from a combustion chamber, on a wall of the turbine and in an inlet area of a high-pressure part of a turbine.

19. The turbomachine of claim 18, wherein the turbomachine is an aircraft engine.

* * * * *